United States Patent
Arakawa

(10) Patent No.: US 10,511,728 B2
(45) Date of Patent: Dec. 17, 2019

(54) IMAGE PROCESSING DEVICE, NON-TRANSITORY COMPUTER-READABLE RECORDING MEDIUM CONTAINING INSTRUCTIONS THEREFOR, AND INFORMATION PROCESSING SYSTEM

(71) Applicant: BROTHER KOGYO KABUSHIKI KAISHA, Nagoya, Aichi (JP)

(72) Inventor: Eiji Arakawa, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 16/257,365

(22) Filed: Jan. 25, 2019

(65) Prior Publication Data
US 2019/0238690 A1    Aug. 1, 2019

(30) Foreign Application Priority Data
Feb. 1, 2018    (JP) .................................. 2018-016087

(51) Int. Cl.
| | |
|---|---|
| H04N 1/00 | (2006.01) |
| G06F 16/51 | (2019.01) |
| G06F 16/54 | (2019.01) |
| G06F 17/24 | (2006.01) |

(52) U.S. Cl.
CPC ......... *H04N 1/00228* (2013.01); *G06F 16/51* (2019.01); *G06F 16/54* (2019.01); *G06F 17/246* (2013.01); *H04N 1/00018* (2013.01)

(58) Field of Classification Search
CPC .............................. H04N 1/00228; G06F 16/51
See application file for complete search history.

(56) References Cited

U.S. PATENT DOCUMENTS

| | | | |
|---|---|---|---|
| 2014/0244668 A1* | 8/2014 | Barrus ................. | G06F 16/21 707/752 |
| 2016/0323224 A1* | 11/2016 | Stein ..................... | H04L 51/22 |

FOREIGN PATENT DOCUMENTS

| | | |
|---|---|---|
| JP | 2006-268645 A | 10/2006 |

* cited by examiner

*Primary Examiner* — Ibrahim Siddo
(74) *Attorney, Agent, or Firm* — Scully, Scott, Murphy & Presser, PC

(57) ABSTRACT

A non-transitory computer-readable recording medium for an information processing device provided with a user interface and a controller, the recording medium storing instructions which cause, when executed by the controller, the information processing device to obtain spreadsheet data and template data, receive an operation to designate one of a plurality of elements included in the spreadsheet data and an operation of designating one of areas in an image indicated by the templated data, generate arranged image data representing an image in which an object image associated with a designated element is arranged in the designated area. When the designated element includes instruction information instructing an obtaining method of object image data, the controller obtains the object image data in accordance with the instruction information, and generates image data representing an arranged image in which the object image is arranged in the designated area in the templated image.

14 Claims, 8 Drawing Sheets

IMAGE PROCESSING DEVICE, NON-TRANSITORY COMPUTER-READABLE RECORDING MEDIUM CONTAINING INSTRUCTIONS THEREFOR, AND INFORMATION PROCESSING SYSTEM

CROSS-REFERENCE TO RELATED APPLICATIONS

This application claims priority under 35 U.S.C. § 119 from Japanese Patent Application No. 2018-016087 filed on Feb. 1, 2018. The entire subject matter of the application is incorporated herein by reference.

BACKGROUND

The present disclosures relate to an image processing device, a non-transitory computer-readable recording medium contacting instructions for the image processing device and an information processing system.

Related Art

There has been known a program which causes a controller of an information processing device to obtain scan data generated by a scanner, and edit an image represented by the scan data in accordance with user operations which is received through a user interface.

SUMMARY

According to the above-mentioned conventional technique, it is necessary that the scan data has been generated by the scanner, and the information processing device should obtain the scan data subject to edit in advance, and operability of such a configuration is relatively low.

According to aspects of the present disclosures, there is provided a 1. A non-transitory computer-readable recording medium for an information processing device provided with a user interface and a controller, the recording medium storing instructions which cause, when executed by the controller, the information processing device to perform a first obtaining process of obtaining spreadsheet data including a plurality of elements arranged in row and column, and a second obtaining process of obtaining template data. Each of the plurality of elements is associated with object image data, the template data being data indicating a template image, the object image indicated by the object image data being arrangeable in an area in the template image. The instructions further cause, when executed, the information processing device to perform an operation receiving process of receiving an element designating operation to designate one of a plurality of elements included in the spreadsheet data obtained in the first obtaining process and an area designating operation of designating one of areas in the templated image indicated by the templated data obtained in the second obtaining process, and a generating process of generating arranged image data representing an image in which an object image represented by the object image data associated with a designated element of the plurality of elements is arranged in the designated area in the template image. The designated element is an element designated in the element designating operation and the designated area is an area designated in the area designating operation. The instructions further cause, when executed, the information processing device to perform, when the designated element includes instruction information instructing an obtaining method of object image data, a third obtaining process of obtaining the object image data in accordance with the instruction information. The generating process is a process of generating image data of the arranged image in which the object image represented by the object image data obtained in the third obtaining process is arranged in the designated area in the templated image.

According to aspects of the present disclosures, there is provided an information processing device, which has a user interface and a controller. The controller is configured to execute obtaining spreadsheet data including a plurality of elements arranged in row and column, obtaining template data, each of the plurality of elements being associated with object image data, the template data being data indicating a template image, the object image indicated by the object image data being arrangeable in an area in the template image, receiving an element designating operation to designate one of a plurality of elements included in the spreadsheet data obtained in the first obtaining process and designating one of areas in the templated image indicated by the templated data, and generating arranged image data representing an image in which an object image represented by the object image data associated with a designated element of the plurality of elements is arranged in the designated area in the template image, the designated element being an element designated in the element designating operation and the designated area is an area designated in the area designating operation. When the designated element includes instruction information instructing an obtaining method of object image data, the controller obtains the object image data in accordance with the instruction information and generating image data of the arranged image in which the object image represented by the obtained object image data is arranged in the designated area in the templated image.

According to aspects of the present disclosures, there is provided an information processing system including an information processing device provided with a communication interface, a user interface and a controller, and a printer configured to communicate with the information processing device through the communication interface. The controller of the information processing device is configured to execute obtaining spreadsheet data including a plurality of elements arranged in row and column, obtaining template data, each of the plurality of elements being associated with object image data, the template data being data indicating a template image, the object image indicated by the object image data being arrangeable in an area in the template image, receiving an element designating operation to designate one of a plurality of elements included in the spreadsheet data obtained in the first obtaining process and designating one of areas in the templated image indicated by the templated data, and generating arranged image data representing an image in which an object image represented by the object image data associated with a designated element of the plurality of elements is arranged in the designated area in the template image, the designated element being an element designated in the element designating operation and the designated area is an area designated in the area designating operation. When the designated element includes instruction information instructing an obtaining method of object image data, the controller obtains the object image data in accordance with the instruction information. The controller further executes generating image data of the arranged image in which the object image represented by the obtained object image data is arranged in the designated area in the templated image and transmitting the generated image data to the printer through the communication interface. The printer is configured to print the generated image data in response to receipt of the generated image data.

BRIEF DESCRIPTION OF THE ACCOMPANYING DRAWINGS

DETAILED DESCRIPTION OF THE EMBODIMENT

Figure 1:
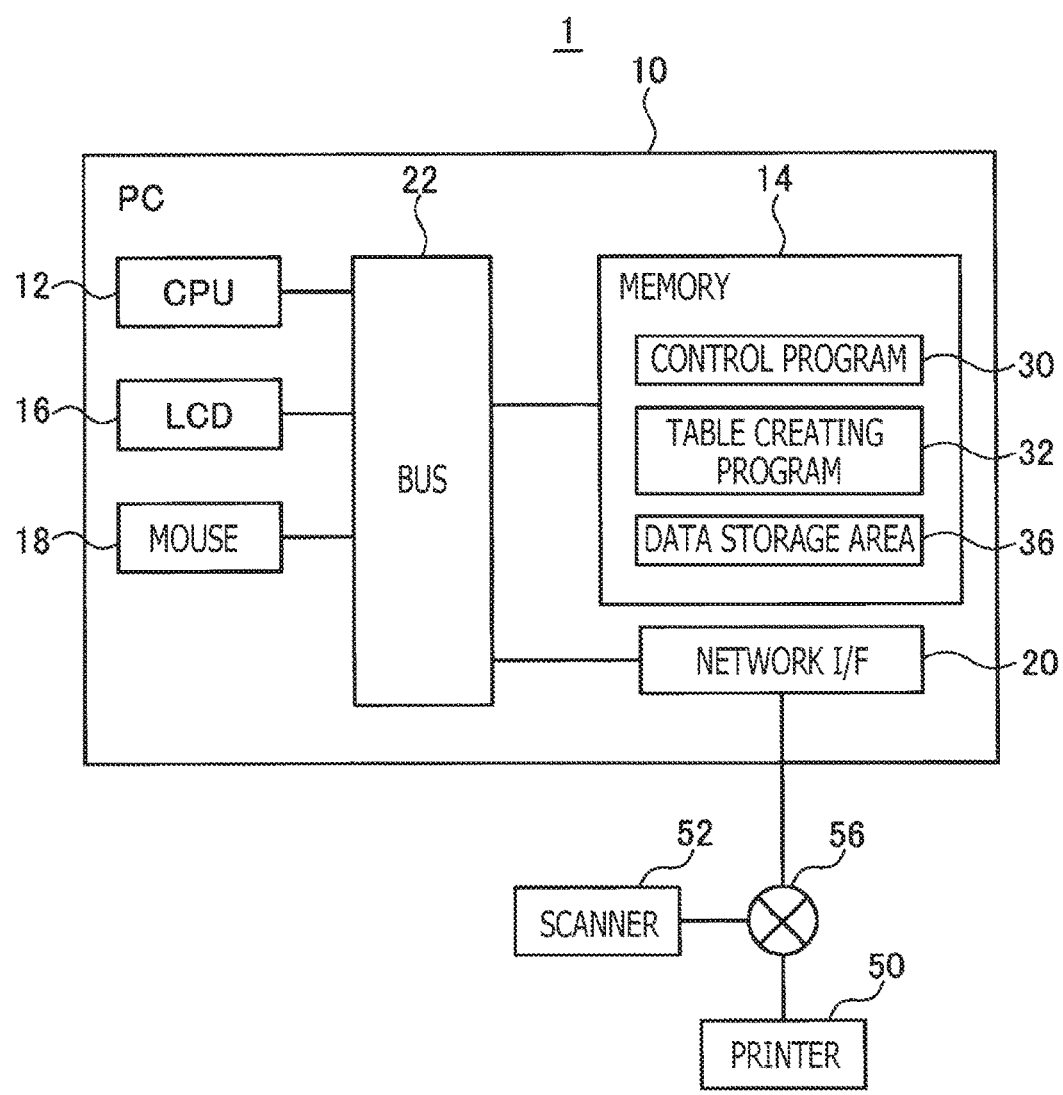
FIG. 1 is a block diagram of a printer system according to an illustrative embodiment of aspects of the present disclosures.

FIG. 1 is a block diagram of a printer system 1 according to an embodiment of the present disclosures. The printer system 1 shown in FIG. 1 is provided with a PC 10 (which is an example of an information processing device), a printer 50 and a scanner 52 (which is an example of a scanner).

The PC 10 mainly has a CPU 12 (which is an example of a computer and a controller), a memory 14, an LCD 16 (which is an example of a display), a mouse 18 (which is an example of a user interface) and a network I/F 20 (which is an example of a communication interface), which are interconnected through a bus 22 so as to be mutually communicatable with each other.

The PC 10 is configured to communicate with the printer 50 and the scanner 52 through a network I/F 20 and the network 56. As a communication method, for example, a wired LAN, a USB, Wi-Fi®, Bluetooth® may be employed.

The printer 50 is a label printer. The printer 50 exchanges various pieces of information and instruction signals with the PC 10, and creates a label on which a user-desired text and images are printed under the control of the PC 10. According to the illustrative embodiment, the printer 50 creates a label by printing objects on an elongated tape made of, for example, laminate. The scanner 52 has an ADF function. That is, the scanner 52 exchanges various pieces of information and instruction signals with the PC 10, and scans one or more sheets of an original document placed on an ADF tray on a page basis under the control of the PC 10 to generate scan data.

The CPU 12 executes processes in accordance with a control program 30 (which is an example of a control program) and a table creating program 32 stored in the memory 14. The control program 30 is a program for generating image data representing an image to be printed by the printer 50. The table creating program 32 is, for example, a spreadsheet program for creating, for example, spreadsheet data including a plurality of cells arranged in rows and columns, that is, image data displaying a plurality of cells in a tabular format configured by at least one row and at least one column, and displays a tabular format image based on the image data. In the following description, the CPU 12 executing respective programs will occasionally be referred to as names of the executed programs. For example, an expression "the control programs 30 does something" actually means "the CPU 12 executing the control program 30 does something."

The memory 14 includes a data storage area 36 (which is an example of a storage area). The data storage area 36 is for storing data necessary for executing the control program 30 and the like. The memory 14 is configured such that a RAM, a ROM, a flash memory, an HDD and a buffer provided to the CPU 12 are suitably combined.

It is noted that the memory 14 may be a computer-readable storage medium. The computer-readable storage medium is a non-transitory medium. The non-transitory medium includes, in addition to the example described above, a recording medium such as a CD-ROM and a DVD-ROM is included. Further, the non-transitory medium is also a tangible medium. In contrast, an electric signal carrying a program which is downloaded from a server on the Internet or the like is a computer-readable signal medium which is a kind of computer-readable medium, but is not fallen within the non-transitory computer-readable storage medium.

The LCD 16 displays various functions the PC 10 is configured to perform. The mouse 18 is used to move a cursor displayed on a display screen of the LCD 16, and interfaces a user's drag movement, a click operation and the like. It is noted that the drag movement, the click operation and the like may be input through another input device, instead of the mouse 18, such as a keyboard, a touch panel and the like.

In the printer system 1, the control program 30 obtains printer information from a printer which performs a printing process. The printer information includes information regarding functions of the printer, information regarding the sizes of printing sheets set to the printer, and the like. The control program 30 displays a preview image (see FIG. 3) having a size corresponding to the size of the printing sheet to be used based on the information regarding the size of the printing sheet included in the printer information.

Further, in the PC 10, the table creating program 32 creates tabular data, or spreadsheet data, and displays a tabular-format image on the LCD 16 based on the created spreadsheet data. When at least partial data of the spreadsheet data created by the table creating program 32 is selected by the user operation, the control program 30 displays a tabular-format image 62, that is, an image configured by a plurality of cells arrange in rows and columns as a candidate of the object image to be printed (hereinafter, referred to as a candidate image) (see FIG. 3) based on the data selected by the user operation. It is noted that the plurality of cells configuring the candidate image are associated with object images subject to be printed.

When the user designates an arbitrary cell in the candidate image 62, and an arbitrary area on the preview image 60 by user operations, the control program 30 generates image data showing a state where an object image associated with the designated cell is arranged in the designated area of the preview image 60, and transmits the generated image to the printer 50. Then, the printer 50 performs the printing process based on the thus transmitted image data.

It is noted that, in the following description, processes of the CPU 12 in accordance with instructions scripted in programs are basically described. Processes indicated by terms "determine," "extract", "select," "calculate," "judge," "identify," "obtain," "receive," "control," and "set" are the processes of the CPU 12. It is noted that the processes executed by the CPU 12 include a hardware control through a controller such as the OS 38. It is further noted that the term "obtain" will be used to include a concept in which a request is not necessary. That is, a process in which the CPU 12 receives data without requesting for the same is included in a concept that the CPU 12 obtains the data. Further, a term "data" in the specification is represented by a computer-readable bit array. A plurality of pieces of data having substantially the same meanings/contents but different formats will be treated as the same data. A term "information" used in the specification will be treated in the same manner. Further, the processes of "instruct," "respond" and "request" are executed by communicating information/data indicating "instruct", "respond" and "request", respectively. Alternatively, the terms "instruct," "respond" and "request" may be used to mean the information indicating the "instruct," "respond" and "request," respectively.

Further, a process of determining, by the CPU 12, whether information A indicates a fact B may be conceptually described such that "the CPU determines whether a fact is the fact B based on the information A." Similarly, a process of determining, by the CPU, whether the information indicates the fact B or a fact C may be described such that "the CPU determines whether a fact is the fact A or the fact B based on the information A."

Figure 2:
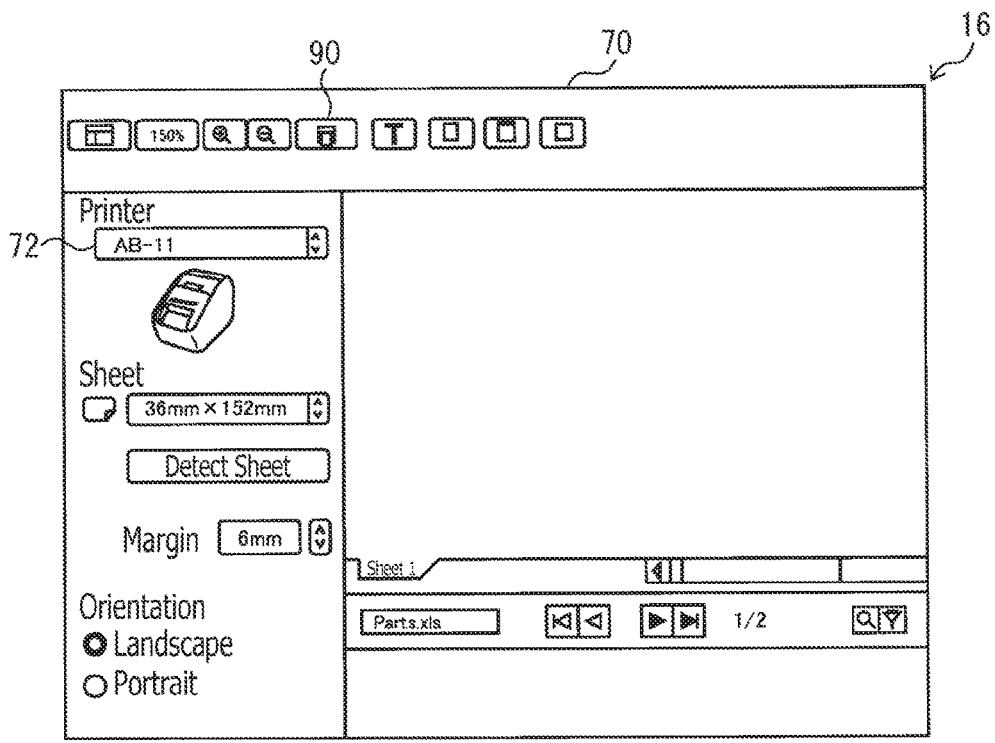
FIG. 2 is an example of an edit screen according to the illustrative embodiment.

Concretely, in the PC 10, the control program 30 displays the edit screen 70 shown in FIG. 2 on the LCD 16. A printer selection button 72 is displayed on the edit screen 70, and a device to be used for printing is selected by the user operation of the printer selection button 72. When, for example, the printer 50 is selected as the device performing a print process, the control program 30 obtains the printer information from the printer 50. Then, based on information on the size of the printing sheet included in the printer information, the control program 30 generates image data for displaying an image corresponding to the size of the printing sheet, and displays a preview image 60 (which is an example of a template image), which is an image based on the generated image data. According to the above process, the preview image 60 having a size corresponding to the size of the printing sheet set to the printer 50 (i.e., the size of the label) is displayed on the edit screen 70 (see FIG. 3).

Figure 3:
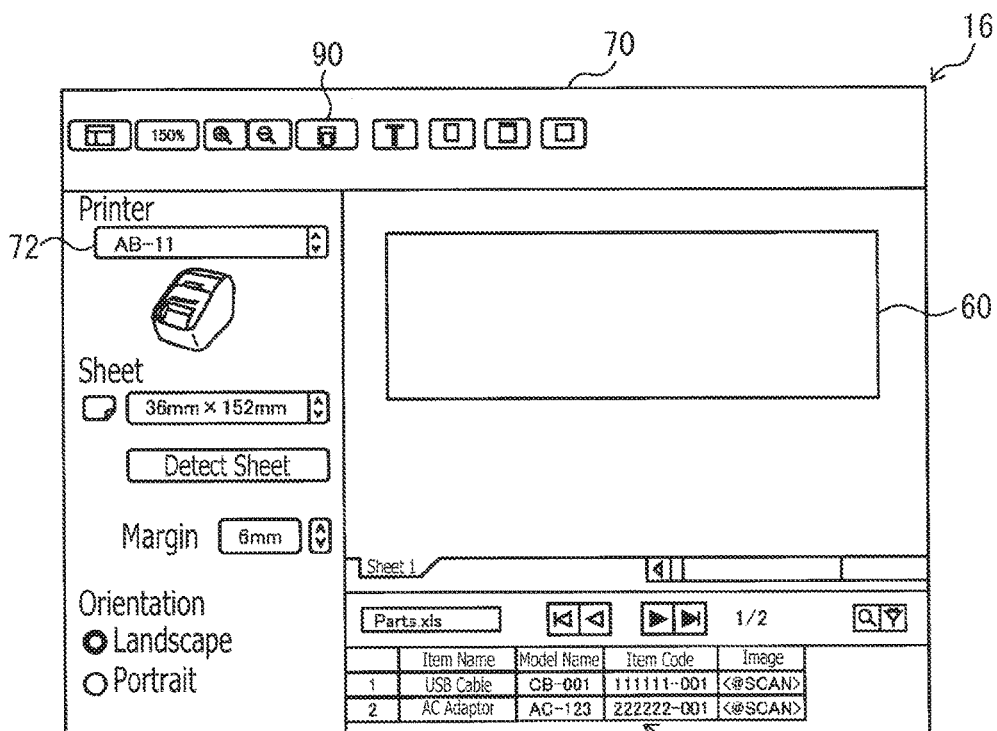
FIG. 3 is another example of an edit screen according to the illustrative embodiment.

In a state where the edit screen 70 is displayed on the LCD 16, a tabular format image (not shown) is displayed, based on the spread sheet data, by the table creating program 32. As the user operates the mouse 18 to select at least a partial area of the tabular format image and move the image of the selected area toward a position below the preview image 60 on the edit screen, the image in the selected area is displayed as a candidate image 62 (which is an example a tabular format image) as shown in FIG. 3.

For example, it is assumed that the user performs a mouse operation to select cells of an arbitrary area (e.g., the cells of two rows×four columns) of the tabular format image. It is further assumed that the user moves the cells of the selected area (hereinafter, "the cells of the selected area" will be simply referred to as the selected area) toward a position below the preview image 60 on the edit screen by a drag and drop operation (hereinafter, referred to as a D & D operation). It is noted that the D & D operation includes a drag operation and a drop operation. The drag operation is an operation to move, with operating the mouse 18, the cursor to a position overlapping an arbitrary image, to depress a left click button of the mouse 18, and moving the cursor to a desired position with holding the left click button depressed. The drop operation is an operation to release the depressed state of the left click button after locating the cursor (i.e., the selected image) at the desired position.

As described above, by moving the selected area from a portion of the tabular image to the edit screen 70 by the D & D operation, an image based on the data included in the selected area (hereinafter, referred to as selected data) of the spreadsheet data created by the table creating program 32 is displayed on the edit screen 70. That is, by the D & D operation of the selected area, the control program 30 obtains the selected data from the table creating program 32, and displays, based on the obtained selected data, the candidate image 62 configured by the two rows×four columns cells at a lower portion of the preview image 60.

Each of the plurality of cells constituting the candidate image 62 is associated with an object image, and in each cell, the associated object image, formation information for forming the associated object image, instruction information instructing a method of obtaining the associated object image are displayed.

Specifically, the plurality of cells arranged in a matrix (i.e., arranged in rows and columns) are categorized (itemized) in each column That is, as shown in FIG. 3, the cells on a first column are associated with object images indicating "item names," the cells on a second column are associated with object images indicating "model names," the cells on a third column are associated with object images indicating "item codes" and the cells on a fourth column are associated with object images indicating "images."

In the cells on the first column, text data indicating "item names" are included as data indicating the object images, and in the cells on the second column, text data indicating "model name" are included as data indicating object images. Further, in the cells on the third column, text data indicating "item codes" are included. As will be described later in detail, the text data included in the cells on the third column are used as the formation information for forming the object images. In each of the cells on the fourth column, text data <@SCAN> is included. The text data <@SCAN> is an example of instruction information which instructs a method of obtaining the image data indicating the associated object. The plurality of cells are configured such that the cells in each row configure one set of data. An object image associated with each set of data (i.e., the cells of each set) can be arranged as the preview image 60. It is noted that, in the following description, the term "text data" may occasionally be simply referred to as "text."

Figure 4:
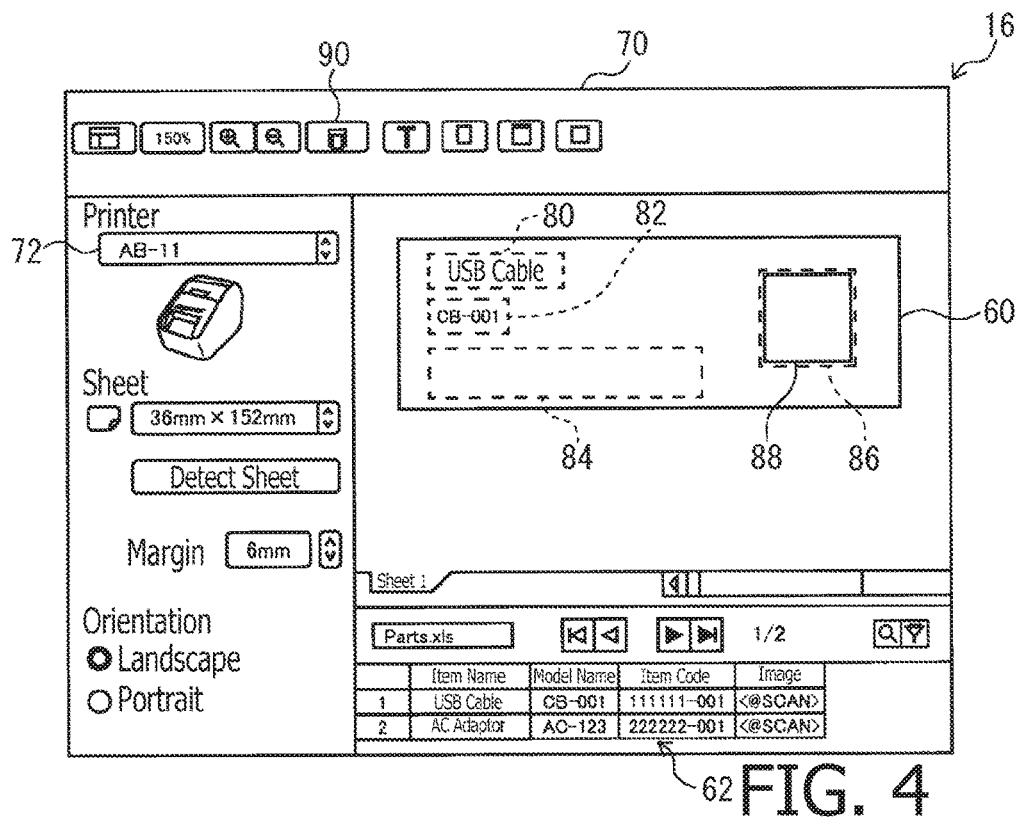
FIG. 4 is another example of an edit screen according to the illustrative embodiment.

For example, it is assumed that the user operates the mouse 18 to move the cursor on the cell of "USB cable" at a first column in a first row of the candidate image 62. Then, the left button of the mouse 18 is depressed with the cursor being located on the cell of the "USB cable" and the mouse 18 is operated so that the cursor is moved to an arbitrary area on the preview image 60, for example, an upper left part inside the preview image 60 with the left button being depressed. Thereafter, when the user releases depressed state of the left button of the mouse 18, the object image associated with the cell of "USB cable" (i.e., the text "USB cable") is displayed in an area 80 at which the depression of the left button is released (i.e., the drop operation is performed) as shown in FIG. 4.

That is, by the D & D operation by the user, an arbitrary cell among a plurality of cells of the candidate image 62 and an arbitrary area of the preview image 60 are designated, and the control program 30 receives operation information designating the arbitrary cell (hereinafter, referred to as "designated cell information") and operation information designating the arbitrary are of the preview image 60 (hereinafter, referred to as "designated area information"). Then, the image data for display in which the object image associated with the designated cell is arranged in the designated area on the preview image 60 based on the designated cell information and the designated area information. That is, the control program 30 displays the preview image 60 which is configured such that the text "USB cable" which is an image based on the text data included in the designated cell is arranged in the area 80. It is noted that, in FIG. 4, the area 80 designated in accordance with the designation information is indicated by dotted lines but it is not actually displayed in the preview screen 60. Similarly, in the following description, an area indicated by dotted lines will not be displayed on the actual preview image 60.

Further, the designated cell information, the designated area information and information regarding the column of the candidate image 62 in which column the cell designated by the designated cell information is included are stored in the data storage area 36 in an associated manner. That is, the information regarding the cell of "USB cable", the information regarding the area 80 of the preview image 60 and the information regarding the column including the cell of "USB cable" (i.e., the first column in this example) are stored in the data storage area 36 in an associated manner.

When the user designates, by performing the D & D operation, the cell of "CB-001" located at a second column in the first row of the candidate image 62, and an area 82, in the preview image 60, below the area 80 in which the text "USB cable" is displayed is designated, the control program 30 displays the object image associated with the designated cell, that is the text "CB-001", which is an image indicated by the text data included in the designated cell in the designated area 82 of the preview image 60. It is noted that the information regarding the cell of "CB-001", the information regarding the area 82 of the preview image 60 and the information regarding the row in which the cell of "CB-001" is included (i.e., second row) are stored in the data storage area 36 in an associated manner.

When the user designates, by performing the D & D operation, the cell of "111111-001" located at a third column in the first row of the candidate image 62 and the area 84 below the area 82, in which the text "CB-001" is displayed, of the preview image 60, information regarding the cell of "111111-001", information regarding the area 84 of the preview image 60, and information regarding the row including the cell of "111111-001" (i.e., the third row) are stored in the storage are 36 in an associated manner. It is noted that the object image associated with the cell of "111111-001" is not displayed in the area 84 of the preview image 60. It is because the area 84 is associated with a process of converting text data to a barcode by the user operation to the control program 30. The object image of the area 84 to which the process is associated is formed only when printing, and is not formed when displayed. That is, the text data included in the cell of "111111-001" is not used as the image data indicating the object image to be displayed, but used as formation information for forming the object image to be printed.

When the user designates, by the D & D operation, a cell of "<@SCAN>" located at a fourth column in the first row of the candidate image 62, and then an area 86 located rightward of the area 82 in which the text "CB-001" is displayed in the preview image 60, information regarding the cell of "<@SCAN>", information regarding the area 86 of the preview image 60 and information regarding the row including the cell of "<@SCAN>" (i.e., the fourth column) are stored in the data storage area 36 in an associated manner. When text data enclosed by symbols <@> is included in the designated cell, the control program 30 interprets the text data as designation information which designates an obtaining method of the object image. In particular, when the text data is <@SCAN>, the control program 30 interprets the text data as the instruction information to instruct, as the obtaining method, a method of obtaining scan data, which is the image data representing the object image, from the scanner. It should be noted that the object image associated with the cell of "<@SCAN>" is not displayed in the area 86 of the preview image 60. It is because, when the text data "<@SCAN>" is included in the designated cell, the control program 30 uses the text "<@SCAN>" as the instruction information instructing the obtaining method of the object image but not the image data indicating the object image. That is, it could be said that the object image of the cell of "<@SCAN>" is obtained only when the object image is printed, and is not obtained for displaying on the preview image 60.

When the cell of "<@SCAN>" is designated, a display frame 88 indicating the area 86 of the preview image 60 which is designated corresponding to the cell of "<@SCAN>" is displayed at the area 86. That is, when the designated cell information of the cell of "<@SCAN>" and the designated area information of the area 86 of the preview image 60 are received, the control program 30 generates image data for display in which the display frame 88 is arranged in the area 86 of the preview image 60, and displays an image based on the generated image data in the preview image 60.

As an area of the preview image 60 is designated, by the D & D operation, for each of the plurality of cells included in the first row of the candidate image 62, the object image of the cell which is associated with the object image of a text among the plurality of cells is displayed in an area of the designated preview image 60. It is noted that object images of the cells associated with the instruction information is not displayed in the area of the designated preview image 60, but the display frame 88 indicating the area is displayed in the area of the designated preview image 60. According to the above configuration, the user can review an arrangement image of the object image to be printed on the label.

While the object images associated with the plurality of cells included in the first row of the candidate image 62 are being displayed in the preview image 60, when the cursor is moved onto a cell included in the second row of the candidate image 62, the object images associated with the plurality of cells included in the second row of the candidate image 62 are displayed in the preview image 60. At this stage, in the areas 80 and 82 of the preview image 60, the object images of the cells included in the columns stored in association with the areas 80 and 82 are displayed.

Figure 5:
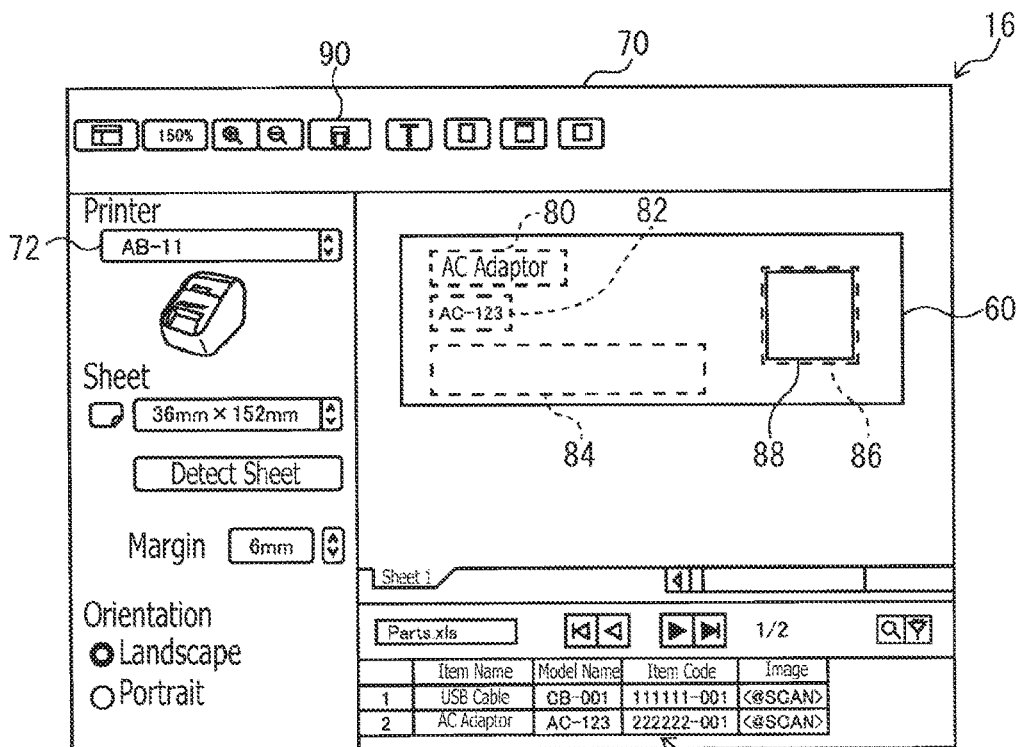
FIG. 5 is another example of an edit screen according to the illustrative embodiment.

Specifically, since the information regarding the area 80 is stored in association with the information regarding the first row of the candidate image 62, as shown in FIG. 5, a text "AC adaptor" which is an image indicated by the text data included in the cell of "AC adaptor" at the first column of the second row of the candidate image 62 is displayed in the area 80 of the preview image 60, and a text "AC-123" indicated by the text data included in the cell of "AC-123" at the second column in the second row of the candidate image 62 is displayed in the area 82 of the preview image 60. According to the above configuration, it is possible to review the arrangement image of the object images of the cells included in the row other than the first row with a simple operation and without the D & D operation.

When the user reviews the preview image 60 and becomes fond of the arrangement image of the object images displayed in the preview image, the user operates the print button 90 displayed on an upper side of the edit screen 70. Then, the control program 30 receives the operation of the print button 90, and generates printing image data (hereinafter, image data for printing will also be simply referred to as printing image data) of the object images associated with the cells included in the first row of the candidate image 62.

It is also possible to generate the image data for printing image data of the object image in a unit of a row of the candidate image 62, or in a unit of the candidate image 62. For example, when the print button 90 is operated once, the printing image data of the object images of the cells on the first row of the candidate image 62 may be generated, or printing image data of the object image of each cell of the candidate image 62 (i.e., the printing image data of the object image of the cells on the first row and the second row) may be generated. In the following description, a case where first row printing image data of the objects on the first row and second row printing image data of the objects on the second row of the candidate image 62 are generated will be described.

When an operation of the print button 90 is received, the control program 30 generates the printing image data of an object arranged in a designated area of the preview image of the object image associated with a plurality of cells included in the first row of the candidate image 62. That is, the control program 30 generates the printing image data in which, as shown in the preview image 60 in FIG. 4, an object image associated with the cell of "USB cable" is arranged in the area 80 of the preview image 60, an object image associated with the cell of "CB-001" is arranged in the area 82 of the preview image 60, an object image associated with the cell of "111111-001" is arranged in the area 84 of the preview image 60 and an object associated with the cell of "<@SCAN>" is arranged in the area 86 of the preview image 60. In this case, the object image of the cell of "USB cable" and the object image of the cell of "CB-001" are included in the respective cells as text data.

It is noted that, although generation information to generate an object image is included in the cell of "111111-001", the object image of the cell of "111111-001" is not generated. Therefore, when the operation of the print button 90 is received, the control program 30 generates the object image based on the generation information included in the cell of "111111-001". The generation information included in the cell of "111111-001" (i.e., "111111-001" is information for generating a barcode (e.g., JAN code). Therefore, the control program 30 generates image data of a barcode including "111111-001".

In the cell of "<@SCAN>", the instruction information instructing a method of obtaining the object image is included. However, the object image of the cell of "<@SCAN>" has not yet been obtained. Therefore, in response to receipt of the operation of the print button 90, the control program 30 obtains the object information based on the instruction information included in the cell of "<@SCAN>". The instruction information of the cell of "<@SCAN>", that is, "<@SCAN>" is information instructing that the scanner is set as the obtaining source of the object image and the object image is to be obtained from the scanner. That is, the instruction information "<@SCAN>" is an instruction to cause the scanner to perform the scanning process, and to obtain the scan data generated in the scanning process as the image data of the object image.

Figure 6A:
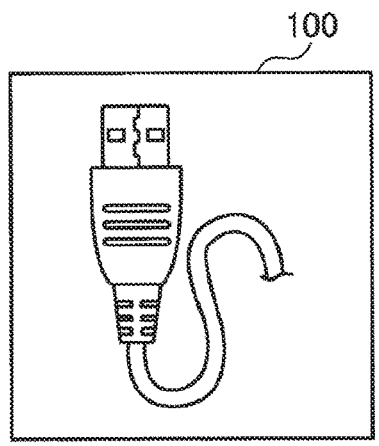
FIG. 6A shows an example of an original set to a scanner.
Figure 6B:
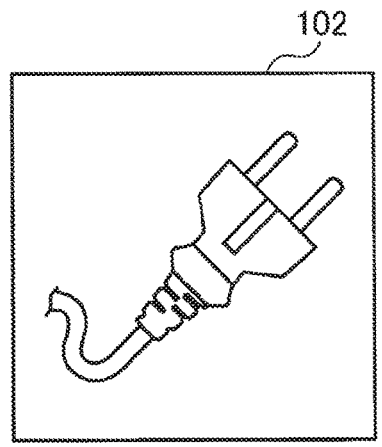
FIG. 6B shows another example of the original set to the scanner.

Therefore, the user sets an original document on which an image subject to be scanned (i.e., an object image) to the ADF tray of the scanner 52. As described above, by a single operation of the print button 90, the printing image data of the object image of the cell in the first row and the printing image data of the object image of the cell in the second row are generated. Accordingly, on the ADF tray, a sheet of the original document on which an object image associated with the cell of "<@SCAN>" in the first row, and another sheet of the original document on which an object image associated with the cell of "<@SCAN>" in the second row are set. For example, it is assumed that two sheets 100 and 200 (see FIGS. 6A and 6B) of the original document are set to the ADF tray. It is also assumed that the two sheets 100 and 200 of the original document are set to the ADF tray such that the sheet 100 is scanned before the sheet 200 is scanned.

In response to receipt of the operation of the print button 90, the control program 30 transmits a scan command instructing the scanner 52 to scan one sheet of the original document. In response to receipt of the scan command, the scanner 52 performs a scanning process of the original sheet 100 to generate scan data of the original 100, and transmits the scan data to the PC 10. According to the above process, the control program 30 obtains the scan data of the original document 100 as the image data of the object image associated with the cell of "<@SCAN>" in the first row.

As described above, the control program 30 generates the image data of the barcode including "111111-001" based on the generation information of "111111-001" and obtains the scan data of the original document 100 in accordance with the instruction information "<@SCAN>".

Thereafter, the control program 30 generates the printing image data representing an image in which the text "USB cable" is arranged in the area 80 of the preview image 60, the text "CB-001" is arranged in the area 82 of the preview image 60, the barcode including "111111-001" is arranged in the area 84 of the preview image 60 and the image based on the scan data of the original document 100 is arranged in the area 86 of the preview image 60.

Figure 7A:
FIG. 7A is an example of a label printed by a printer.

Then, the control program 30 transmits the generated print image data and a print command to the printer 50. Then, the printer 50 performs the printing process based on the received printing image data to create a label 110 as shown in FIG. 7A.

After generating the printing image data and transmitting the same to the printer 50, the control program 30 generates printing image data of the object images associated with a plurality of cells included in the second row of the candidate image 62. That is, the control program 30 generates the printing image data of the preview image 60 in which, as shown in FIG. 5, an object image associated with the cell of "AC adaptor" is arranged in the area 80 of the preview image 60, an object image associated with the cell of "AC-123" is arranged in the area 82 of the preview image 60, an object image associated with a cell of "222222-001" is arranged in the area 84 of the preview image 60 and an object associated with the cell of "<@SCAN>" is arranged in the area 86 of the preview image 60.

In this case, similarly to the configuration described above, the control program 30 generates image data of the barcode including "222222-001" based on the generation information "222222-001", and obtains scan data of the original document kk102 based on the instruction information "<@SCAN>". Then, the control program 30 generates printing image data of an image in which text "AC adaptor" is arranged in the area 80 of the preview image 60, text "AC-123" is arranged in the area 82 of the preview image 60, a barcode including "222222-001" is arranged in the area 84 of the preview image 60 and an image based on the scan data of the original 102 is arranged in the area 86 of the preview image 60.

Figure 7B:
FIG. 7B is another example of a label printed by the printer.

Thereafter, the control program 30 transmits the generated printing image data and the print command to the printer 50. Then, the printer 50 performs the printing process based on the received printing image data, thereby the label 112 shown in FIG. 7B being created.

Figure 8:
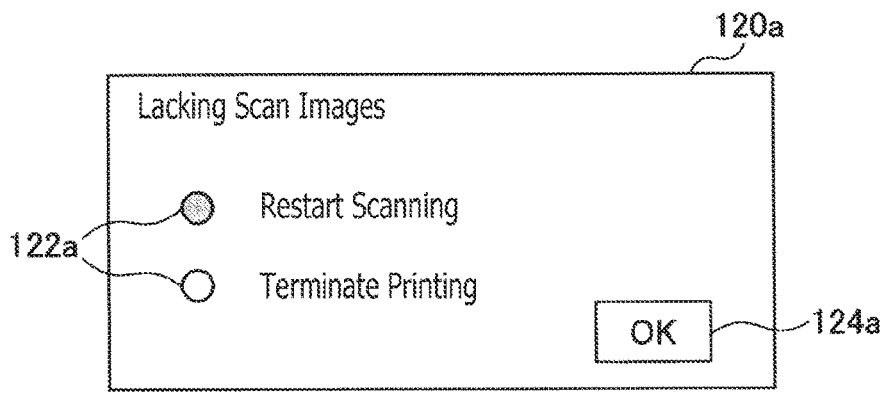
FIG. 8 shows an example of an announcement screen.

As described above, by operating the print button 90, the printing image data of the object images for the cells in the first row and the printing image data of the object images for the cells in the second row are generated. Therefore, two sheets of original document 100 and 102 should be set to the ADF tray of the scanner 52. However, there could be a case where the user sets only one sheet of original document to the ADF tray, or the scanning process may not be performed appropriately due to occurrence of jam during the scanning process. In such a case, that is, in a case where two pieces of scan data cannot be obtained although the two kinds of pieces of printing image data are required, the control program 30 displays a notifying screen 120a as shown in FIG. 8 on the LCD 16. On the notifying screen 120a, a selection button 122a to select restarting of scanning process or termination of printing, and an OK button 124a to confirm the selection. When the user wishes restarting of the scanning process, the user may operate the selection button 122a to restart the scanning and the OK button 124a after setting the original document to the ADF tray of the scanner 52 and/or resolving jam state or the like of the scanner 52. Then, the control program 30 transmits the scan command to the scanner 52. As a result, the control program 30 obtains two pieces of scan data which are necessary to generate two kinds of printing image data. It is noted that, when the selection button 122a to select termination of printing and the OK button 124a, the control program 30 terminates the printing process.

According to the above-described embodiment, the control program 30 generates one piece of printing image data every time when one piece of scan data is obtained. This configuration may be changed such that the control program 30 obtains all the pieces of scan data firstly, and then using, in sequence, all the pieces of scan data as obtained, the control program 30 may generate required printing image data piece by piece. That is, according to such a modification, the control program 30 may obtain the scan data of the original document 100 and the scan data of the original document 102 before generating the printing image data. Then, making use of the scan data of the original document 100, the control program 30 may generate the printing image data of the object images of the cells in the first row of the candidate image 62. Thereafter, making use of the scan data of the original document 102, the control program 30 may generate the printing image data of the object images of the cells in the second row of the candidate image 62.

Specifically, when transmitting the initial scan command to the scanner 52, the control program 30 transmits the scan command to scan all the sheets of the original document placed on the ADF tray to the scanner 52. Then, the control program 30 obtains the scan data of all the sheets of the original document set to the ADF tray and stores the thus obtained scan data in the data storage area 36. Next, when the printing image data of the object images of the cells in the first row in the candidate image 62 is generated, the control program 30 obtains the image data of the object image associated with the cell of "<@SCAN>" in the first row, that is, the scan data of the original document 100 from the data storage area 36. Further, when generating the printing image data of the object images of the cells on the second row of the candidate image 62, the control program 30 obtains the image data of the object image associated with the cell of "<@SCAN>" in the second row, that is, the control program 30 obtains the scan data of the original document 102 from the data storage area 36, and generates, with use of the obtained scan data, the printing image data of the object images of the cells in the second row. As above, by collectively scanning all the sheets of the original document set to the ADF tray of the scanner 52, it is possible to generates two or more kinds of printing image data.

According to the above-described embodiment, a case where the obtaining information "<@SCAN>" instructing the obtaining method to obtain the scan data, which is the image data representing the object image, from the scanner is included in the cell of the candidate image 62 is described as an example. Hereinafter, a case where obtaining information instructing an obtaining method to designate a particular folder in the data storage area 36 as an obtaining source 5 of the image data and instructing the image data indicating the object image from the folder is included in the cell in the candidate image 62 with reference to FIG. 9.

Figure 9:
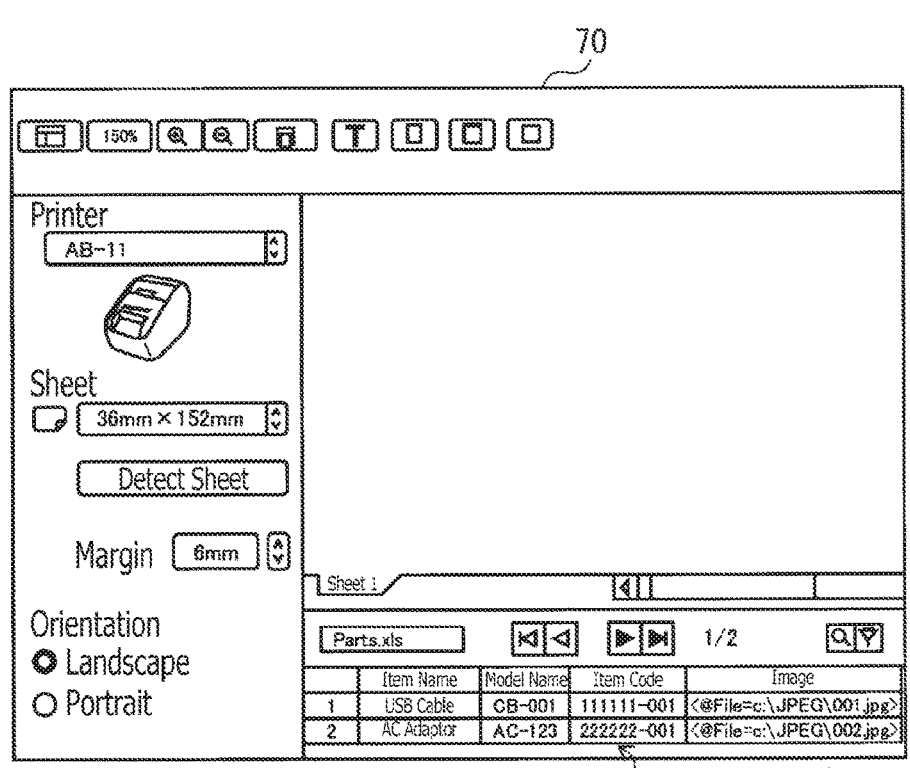
FIG. 9 is another example of an edit screen according the embodiment of the present disclosures.

A candidate image 130 shown in FIG. 9 will be described. Since the first column to the third column of the candidate image 130 are the same as those of the candidate image 62 described above, description thereof is omitted. Text data enclosed in "<@File=>" which is included in the fourth column is the instruction information indicating the obtaining method to obtain the image data indicating the object image. That is, a character string "@File" followed by another character string (e.g., "C:\JPEG\001.jpg") are enclosed between a left-pointing bracket "<" and a right-pointing bracket ">" indicates a method of obtaining image data file. Specifically, the character string "@File" indicates that the object image is a file stored in a particular folder, which is stored in the data storage area 36. The folder and the file are indicated by the text data following the symbol "=".

In the candidate image 130, a cell at the fourth column of the first row, that is, a cell including text data "<@File=C:\JPEG\001.jpg>" is designated, and the area 86 of the preview image is designated in correspondence with the designated cell, the object image of the cell including the text data "<@File=C:\JPEG\001.jpg>" is displayed in the area 86 of the preview image 60.

Concretely, the instruction information "<@File=C:\JPEG\001.jpg>" is information designates the folder "C:\JPEG" as the obtaining source of the object image, and instructing to obtain the image data file "001.jpg" from the folder as the image data indicating the object image. Therefore, when the cell including the instruction information "<@File=\JPEG\001.jpg>" is designated, the control program 30 the image data file stored in the folder identified by the instruction information "<@File=\JPEG\001.jpg>" as the image data indicating the object image.

Figure 10:
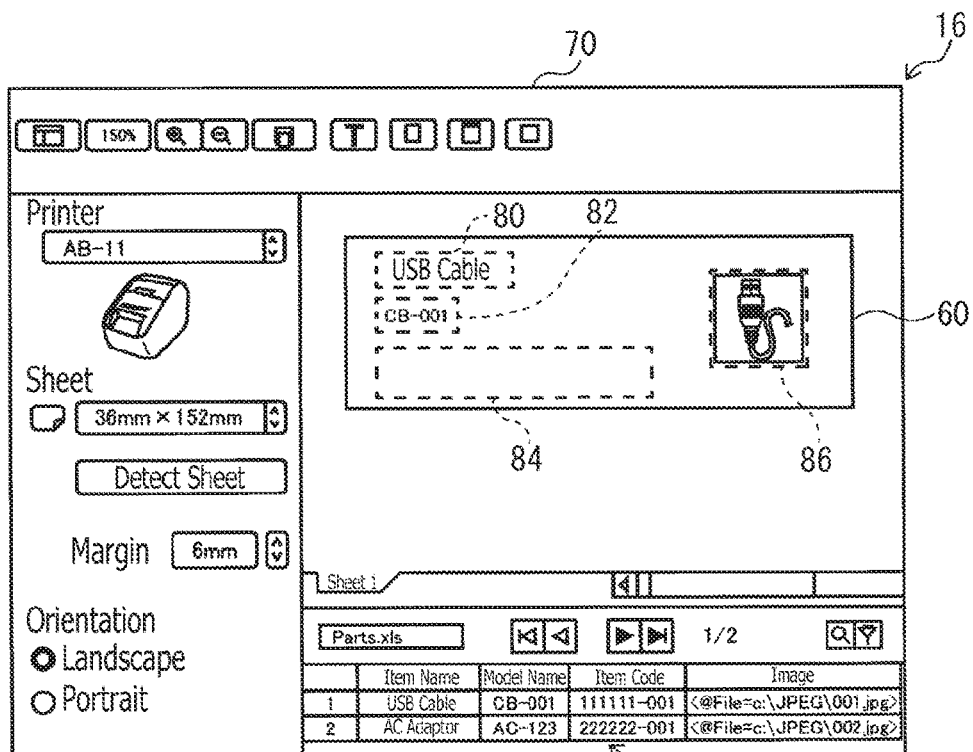
FIG. 10 is another example of the edit screen according the embodiment of the present disclosures.

It is noted that the user should store the image data of the object image corresponding to the cell of "<@File=C:\JPEG\001.jpg>" in the folder identified by "C:\JPEG\001.jpg" in advance. According to the present example, in the folder identified by the instruction information of "<@File=C:\JPEG\001jpg>", the image data of the image printed on the original document 100 as shown in FIG. 4A is stored. When the control program 30 obtains the image data stored in the folder identified by the instruction information "<@File=C:\JPEG\001.jpg>", that is, the image data of the image printed on the original document 100, as shown in FIG. 10, the image printed on the original document 100 is displayed on the area 86 of the preview image 60. According to the above process, the user can review the arrangement image of the object images based on the image data obtained based on the instruction information.

Further, when the print button 90 is operated in a case where the first through fourth columns in the first row of the candidate image 130 are designated, and when the areas 80, 82, 84 and 86 of the preview image 60 are designated corresponding to the respective ones of the designated cells, the control program 30 obtains image data of the images printed on the original document 100 from the folder identified by the instruction information of "<@File=C:\JPEG\001.jpg>". Thereafter, the control program 30 generates printing image data of an image in which the text "USB cable" is arranged in the area 80 of the preview image 60, the text "CB-001" is arranged in the area 82 of the preview image 60, a barcode including "111111-001" is arranged in the area 84 of the preview image 60, and the image printed on the original document 100 and retrieved from the folder is arranged in the area 86 of the preview image 60. Then, the control program 30 transmits the generated printing image data and a print instruction to the printer 50, thereby the printer 50 creating the label 110 shown in FIG. 7A.

It is noted that the cell at the fourth column in the second row of the candidate image 130 includes the instruction information of "<@File=C:\JPEG\002.jpg>". When, for example, the user has stored the image data of the image printed on the original document 102 shown in FIG. 4B in the folder identified by the instruction information "<@File=C:\JPEG\002.jpg>", the control program 30 generates printing image data of an image in which the text "AC adaptor" is arranged in the area 80 of the preview image 60, the text "AC-123" is arranged in the area 82 of the preview image 60, a barcode including "222222-001" is arranged in the area 84 of the preview image 60 and an image printed on the original document 102 and is retrieved from the folder is arranged in the area 86 of the preview image 60. Then, the controller 30 transmits the generated printing image data and a print instruction to the printer 50, thereby the printer 50 creating the label 112 shown in FIG. 7B.

Figure 11:
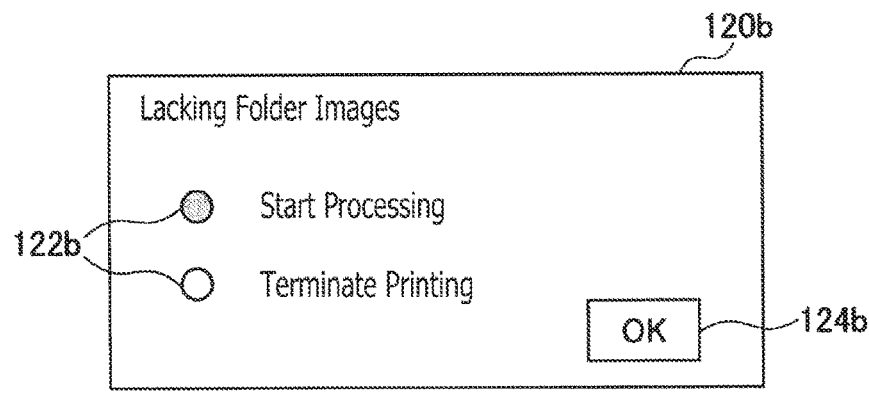
FIG. 11 shows an example of the announcement screen.

There could be cases where image data is not stored in the folder identified by the instruction information "<@File=C:\JPEG\001.jpg>", the folder itself is not stored in the data storage area 36 and the like. In such a case, the control program 30 cannot obtain an object image in accordance with the instruction information. When the control program 30 fails to obtain the object image in accordance with the instruction information, the control program 30 displays a notification screen 120b as shown in FIG. 11 on the LCD 16. On the notification screen 120b, selection buttons 122b to select re-start of the printing process or termination of the printing process, and an OK button 124b are displayed. When the user wishes to restart the printing process, the user may store the image data in the folder, create a folder and the like, then, operate one of the selection buttons 122b to restart the process and the OK button 124b. Then, the control program 30 obtains the object image again in accordance with the instruction information. As above, the control program 30 can generates the printing image data. When the user selects one of the buttons 122b to select termination of the process and the OK button 124b, the printing process performed by the control program 30 is terminated.

Displaying of the preview image 60 and generation of the printing image data are performed as the CPU 12 executes the control program 30. Hereinafter, referring to FIGS. 12-15, processes when the control program 30 is executed by the CPU 12 will be described.

Figure 12:
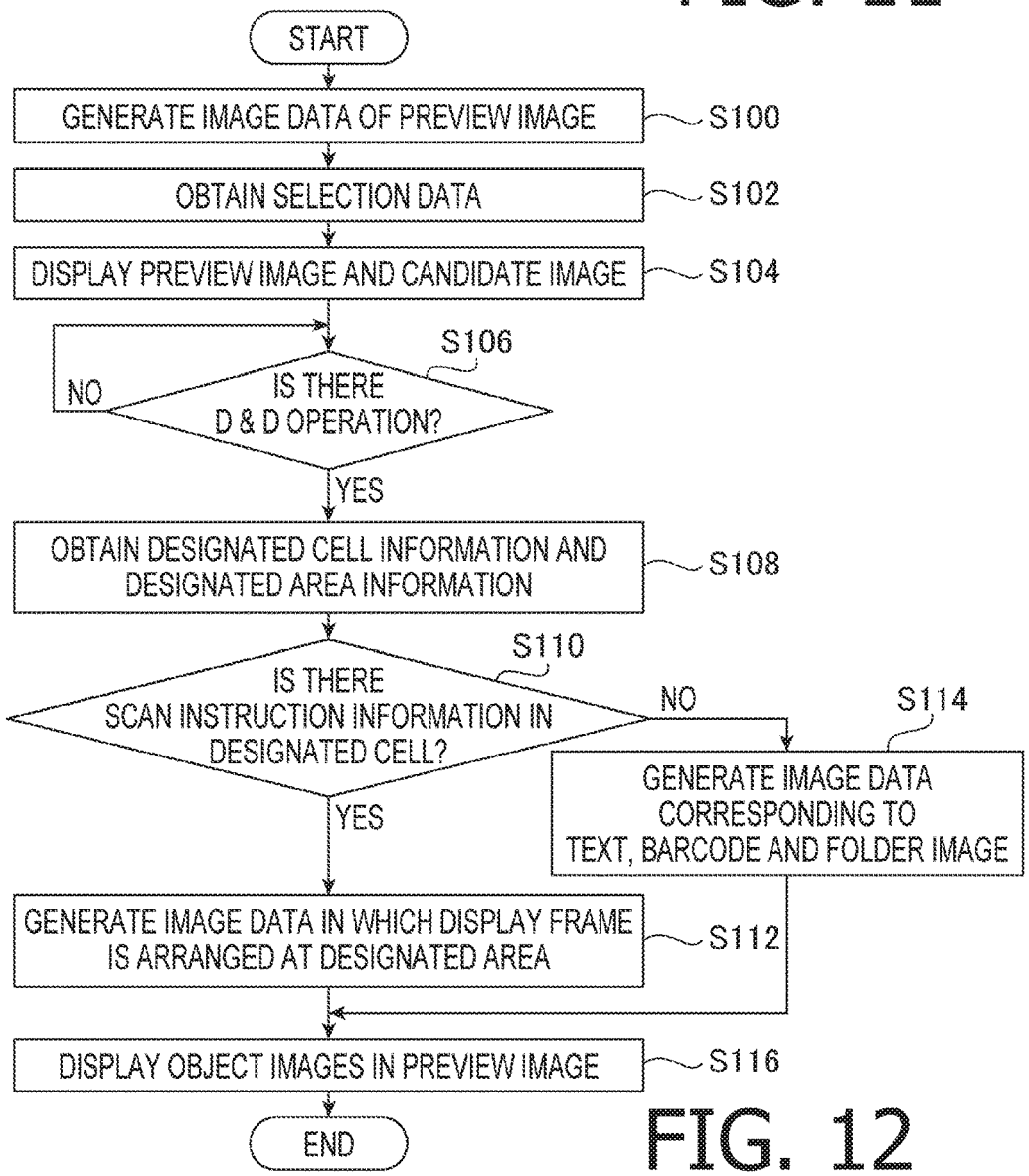
FIG. 12 shows a flowchart illustrating a main process executed by a CPU of the information processing device according to the illustrative embodiment.

When the preview image 60 is to be displayed, the control program 30 generates the image data (S100) of the preview image 60 based on the printer information received from the selected printer as shown in FIG. 12. Further, the control program 30 obtains data included in the selected area of the spreadsheet data from the table creating program 32 (i.e., the selection data) (S102). Then, the control program 30 displays the preview image 60 and the candidate image 62 on the edit screen 70 (S104), based on the image data generated in S100 and the selection data obtained in S102.

Next, the control program 30 determines whether a D & D operation has been made on the preview screen 60 and the candidate image 62 (S106). When no D & D operation is made (S106: NO), the process of S106 is repeated. When a D & D operation is made (S106: YES), the control program 30 obtains the designated cell information and the designated area information (S108). Then, based on the designated cell information, the control program 30 determines whether the designated cell includes the instruction information instructing to obtain an object image from the scanner (S110).

When it is determined that the instruction information instructing to obtain the object image from the scanner is included in the designated cell (S110: YES), the control program 30 generates image data having a display frame 88 at the designated area of the preview image 60 (S112). Thereafter, the control program 30 proceeds to S116.

On the other hand, when the instruction information instructing to obtain the object image from the scanner is not included in the designated cell (S110: NO), the control program 40 generates image data corresponding to the text, the barcode, and the image stored in the folder (S114). That is, when the text data is included in the designated cell, the control program 30 generates image data representing an image in which a text is arranged at the designated area of the preview image 60. When instruction information instructing to obtain the object image from the folder is included in the designated cell, the control program 30 generates image data representing an image in which the image obtained from the folder is arranged at the designated area of the preview image 60. When generating information of the barcode is included in the designated cell, the control program 30 generates image data representing an image in which no image is included in the designated cell of the preview image 60. Then, the control program proceeds to S116. In S116, object images based on the image data generated in S112 and S114 are displayed on the preview image 60. Then, the present process is terminated.

Figure 13:
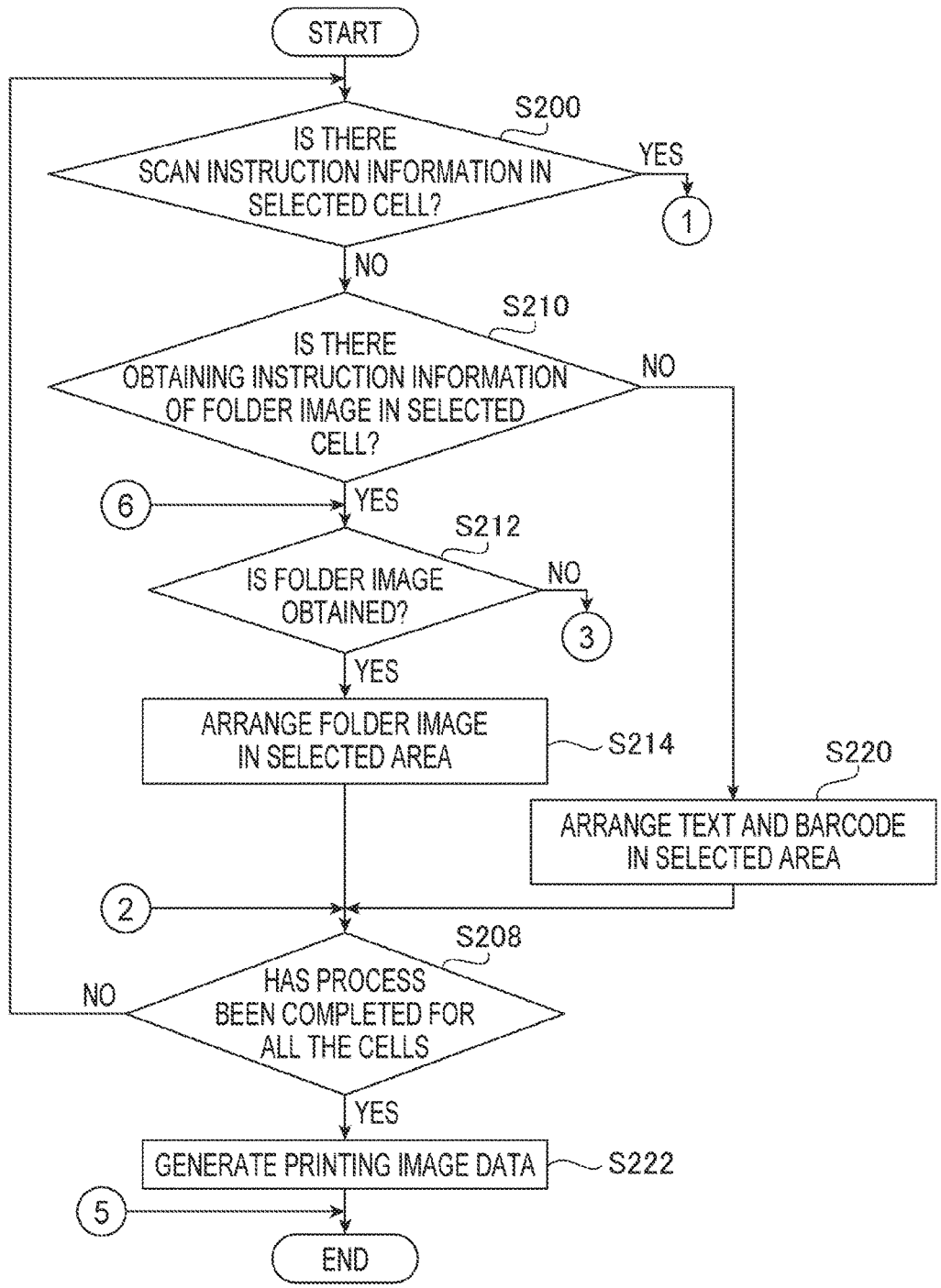
FIGS. 13-14 show a flowchart illustrating a control program according to the illustrative embodiment.
Figure 14:
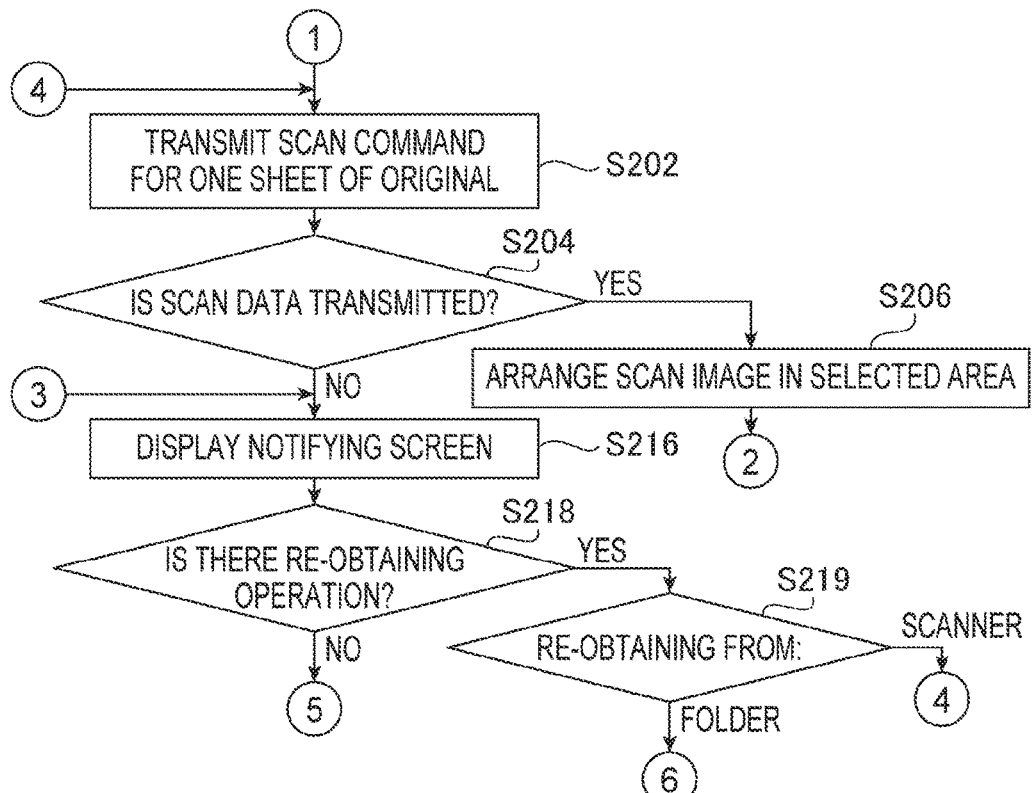

When the printing image data is generated, the control program 30 determines, based on the designated cell information, whether instruction information instructing to obtain the object image from the scanner is included in the designated cell (S200 of FIG. 13). When it is determined that the instruction information instructing to obtain the object image from the scanner is included in the designated cell (S200: YES), as shown in FIG. 14, the control program 30 transmits a scan command to scan one sheet of the original document to the scanner 52 (S202). Then, the control program 30 determines whether the scan data is received from the scanner (S204).

When it is determined that the scan data has been received from the scanner 52 (S204: YES), the control program 30 arranges an image based on the scan data in the designated area of the preview image 60 (S206). Then, as shown in FIG. 13, the control program 30 determines whether object images of all the cells have been arranged at particular areas of the preview image 60 (S208). When the object images of all the cells have not been arranged at the particular areas of the preview image 60 (S208: NO), the control program 30 returns to S200. When it is determined that the object images of all the cells have been arranged at the particular areas of the preview image 60 (S208: YES), the control program 30 generates the printing image data representing an image in which the object images are arranged at the particular areas of the preview image 60 (S222). Then, the process is terminated.

When it is determined that the instruction information instructing to obtain the object image from the scanner is not included in the designated cell (S200: NO), the control program 30 determines, as shown in FIG. 13, whether instruction information instructing to obtain an object image from the folder is included in the designated cell (S210). When it is determined that the instruction information instructing to obtain the object image from the folder is included (S210: YES), the control program 30 determines whether an image has been obtained from the folder designated by the instruction information (S212).

When it is determined that the object image has been obtained from the folder (S212: YES), the control program 30 arranges the image obtained from the folder in the designated area of the preview image 60 (S214). Then, the control program 30 executes processes of S208 onwards.

When it is determined that the instruction information instructing to obtain the object image from the folder is not included (S210: NO), the control program 30 arranges a text or a barcode at the designated area of the preview image 60 (S220). That is, when the text data is included in the cell, the control program 30 arranges the text included in the cell in the designated area of the preview image 60. When the formation information is included in the designated cell, the control program 30 generates a barcode based on the formation information, and arranges the generated barcode in the designated area of the preview image 60. Thereafter, the control program 30 executes processes S208 onwards.

The it is determined that the scan data has not been received from the scanner 52 (S204: NO), or when it is determined that the object image cannot be obtained from the folder (S212: NO), the control program 30 displays the notifying screens 120a and 120b on the LCD 16 (S216). Then, the control program 30 determines whether a user operation of re-obtaining of the scan data from the scanner or re-obtaining of the image from the folder is made (S218). When there is an user operation to re-obtain the scan data from the scanner (S218: YES; S219: SCANNER), the control program 30 proceeds to S202. When there is a user operation to re-obtain the image from the folder (S218: YES; S219: FOLDER), the control program 30 proceeds to S212 (FIG. 13). When there is no user operation of re-obtaining (S218: NO), the process of FIG. 14 is terminated.

Figure 15:
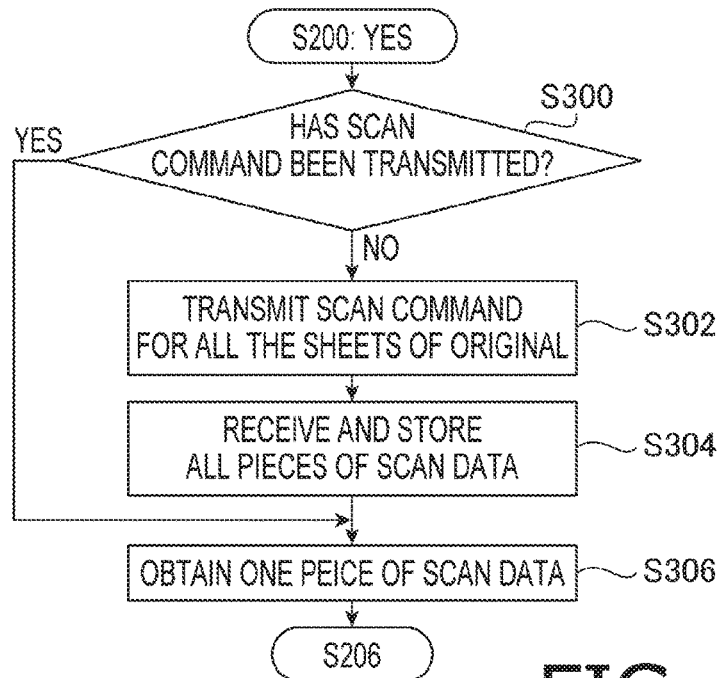
FIG. 15 shows a partial flowchart which can be executed instead of a partial flowchart shown in FIG. 14.

According to the flowcharts shown in FIGS. 13 and 14, when the printing image data is generated, one piece of printing image data is generated every time when one piece of scan data is obtained. The configuration may be modified such that all the pieces of scan data are obtained before generating the printing image data, and required pieces of printing image data are sequentially generated using all the pieces of scan data as obtained. Such a modification is shown in FIG. 15 which replaces S202-S204 of FIG. 14.

When the instruction information instructing to obtain the object image from the scanner is included in the designated cell (S200: YES), the control program 30 determines whether the scan command has already been transmitted as shown in FIG. 15 (S300). When it is determined that the scan command has not been transmitted (S300: NO), the control program 30 transmits the scan command to scan all the sheets of the original document set to the ADF tray to the scanner 52 (S302).

Next, the control program 30 receives the scan data in accordance with transmission of the scan command, then stores all the pieces of received scan data in the data storage area 36 (S304). Then, the control program 30 proceeds to S306. When the scan command has already been transmitted (S300: YES), the control program 30 also proceeds to S306. In S306, the control program 30 obtain one piece of scan data subject to be obtained from the scan data stored in the data storage area 36. Then, the control program 30 proceeds to S206 (FIG. 14). It is noted that, when the control program 30 cannot receive the same number of pieces of scan data as the required number of pieces of printing image data, the control program 30 proceeds to S216 (FIG. 14).

It is noted that S100 executed by the CPU 12 is an example of a first obtaining process. S102 executed by the CPU 12 is an example of a second obtaining process. S104 executed by the CPU 12 is an example of a second display control process. S108 executed by the CPU 12 is an example of an operation receiving process. S116 executed by the CPU 12 is an example of a first display control process. S204, S212 and S306 executed by the CPU 12 an example of a third obtaining process. S222 executed by the CPU 12 is an example of a generating process.

<Effects Achieved by Illustrative Embodiment>

According to the above-described illustrative embodiment, at least the flowing effects can be achieved.

The control program 30 generates the image data of the preview image 60 based on the printer information obtained from the selected printer, and displays the preview image on the edit screen 70. Further, the control program 30 obtains selection data included in the selected area of the spread sheet data from the generating program 32, and displays the candidate image 62 including a plurality of cells arranged in a matrix (i.e., in rows and columns) on the edit screen 70 based on the selection data. It is noted that the plurality of cells included in the candidate image 62 are associated with object images, respectively. The control program 30 receives a designation operation of an arbitrary cell among the plurality of cells included in the candidate image 62 and a designation operation of an arbitrary area of the preview image 60. Next, when the cell designated by the designation operation includes the instruction information, the control program 30 obtains an object image in accordance with the instruction information, and generates the image data of an image in which the obtained object image is arranged in the area, which is designated by the designating operation, of the preview image 60. According to this configuration, as the instruction information is included in the cell, it becomes possible to obtain an object image from, for example, a particular device, folder or the like, and outputs an image in which the object is arranged on the preview image 60.

When the instruction information indicates that the scanner is set as the obtaining source of the object image and includes an instruction to obtain the object image from the scanner, the control program 30 transmits a scan command to the scanner 52 and obtains the scan data as the object image from the scanner 52. According to this configuration, when the scanner 52 has not been caused to perform a scanning process to store scan data in the data storage area 36 in advance, simply by setting the original document on which the object images are printed to the scanner 52, an image in which images represented by the scan data are arranged on the preview image 60 can easily be output.

Every time when receiving a piece of scan data from the scanner 52, the control program 30 generates a piece of image data representing an image in which an image based on the obtained piece of scan data is arranged on the preview image 60, and every time when the image data is generated, the control program 30 outputs an image based on the image data. According to such a configuration, it becomes possible to appropriately associate the images based on the scan data with the images arranged on the preview image 60.

When the number of pieces of scan data as the required number of pieces of image data cannot be obtained, the control program 30 displays a notifying screen 120*a* on the LCD 16. Then, when the user makes a user operation to re-obtain the scan data in accordance with the content of the notifying screen 120*a* as displayed, the control program 30 transmits a scan command to the scanner. Thus, it is guaranteed that the scan data can be obtained.

When the cell designated by the designating operation includes a text, the control program 30 generates image data of an image in which the text is arranged on the preview image 60 which is also designated by the designating operation, and displays the image based on the image data on the preview image 60. When the designated cell which is designated by the designating operation includes the instruction information instructing to obtain the object image from the scanner, the control program 30 generates image data representing an image in which the display frame 88 is arranged in an area of the preview image 60 designated by the designating operation, and displays an image based on the generated image data on the preview image 60. Then, after the displaying frame 88 is displayed on the preview image 60, the control program 30 transmits the scan command to the scanner 52, obtains the scan data from the scanner 52 as the object image, and generates the image data representing an image in which an image based on the scan data is arranged on the preview image 60. According to the above configuration, it is possible that the scanner is caused to execute the scanning process only when it is necessary, thereby the number of execution of the scanning process being suppressed.

When the instruction information sets a folder stored in the data storage area 36 as the obtaining source of the object images, and instructs to obtain the object image from the folder, the control program 30 obtains the scan data from the folder as the object image. According to this configuration, simply by storing the object image in the folder, it becomes possible to output an image in which the object image is arranged on the preview image 60 easily.

When the number of object images same as the number of the requested images cannot be obtained from the folder, the control program displays the notifying screen 120*b* on the LCD 16. Further, when receiving the user operation, in accordance with the content of the notifying screen 120*b*, to re-obtain the object image, the control program 30 re-obtains the object image from the folder. Thus, it is guaranteed that the object image can be obtained from the folder.

The preview image 60 accepts a designating operation to designate two or more cells from among the plurality of cells included in the candidate image 62, and a designating operation to designate arbitrary areas on the preview image 60 which are designated corresponding to the respective ones of the two or more cells. Then, the control program 30 generates image data representing an image in which the object images respectively associated with the two or more designated cells are arranged in the designated areas, which are designated corresponding to the two or more cells, on the preview image 60. According to the above configuration, it is possible that a plurality of object images are arranged in arbitrary areas on the preview image 60.

For example, when a designating operation to designate a cell of "USB cable" included in the first column of the first row of the candidate image 62, and a designating operation to designate the area 80 of the preview image 60 are received, the control program 40 generates image data representing an image in which the text "USB cable" is arranged in the area 80 of the preview image 60 (see FIG. 4). Further, the control program 30 generates an object image of the cell of "AC adaptor" included in the first column of the second row of the candidate image 62, that is, the control program 30 generates image data representing an image in which the text "AC adaptor" is arranged in the area 80 of the preview image 60 (see FIG. 3). According to such a configuration, it is possible to generate imaged data of an image in which a plurality of object images is arranged in the same area.

The control program 30 generates image data representing an image in which object images associated with the designated cells which are designated in accordance with the user's designating operation are arranged in the areas, which are designated by the user's designating operation, of the preview image 60. According to this configuration, it becomes possible to print an image in which the object images are arranged at arbitrary positions on the printing sheet.

In accordance with the user's D & D operation between the preview image 60 and the candidate image 62 displayed on the edit screen 70, the control program 30 receives the designating operation of the cells and the designation operations of the areas. According to this configuration, with a relatively easy user operation, arbitrary cells of the candidate image 62 and the arbitrary areas of the preview image 60 can be designated.

It is noted that aspects of the present disclosures need not be limited to the configuration of the above-described embodiment. Rather, aspects of the present disclosures should include various modifications, improvements of the above-described embodiment based on knowledge of person skilled in the art. For example, in the above-described embodiment, arbitrary cells of the candidate image 62 and arbitrary areas of the preview image 60 are designated. However, such designations may be made by left-click operation of the mouse 18, input operation of location information of the cells.

According to the above-described embodiment, by the user operations to the preview image 60 and the candidate image 62 displayed on the LCD 16, the areas on the candidate image 62 and the preview image 60 are designated. The configuration may be modified such that, by inputting position information of the cells and/or areas, cells or the candidate image 62 and/or areas on the preview image 60 may be designated without displaying the preview image 60 or the candidate image 62 on the LCD 16.

According to the above-described embodiment, on one sheet of the original document set to the scanner 52, only one object image is drawn. However, aspects of the present disclosures may be modified such that a plurality of object images may be formed on one sheet of the original document. In such a case, each of the plurality of objects may be recognized based on the scan data and used for generating a plurality of pieces of printing image data. For example, with use of a first one of the plurality of object images, first printing image data may be generated, and with use of a second one of the plurality of object images, second printing image data may be generated.

According to the above-described embodiment, the label printer configured to create a label by printing an object image onto an elongated tape. It is noted that another type of printer, for example, a printer configured to print an object onto a cut sheet (e.g., A4 size sheet) may be employed instead of the label printer. Further, instead of the label printer, a device configured to form an object image onto a surface of a material other than paper (e.g., a surface of cloth, metal, glass and the like) may be employed instead of the label printer.

According to the above-described embodiment, the selected data among the spreadsheet data generated by the table creating program 32 is moved, by the D & D operation, to the edit screen 70, thereby the candidate image 62 is displayed on the edit screen 70. The configuration may be modified such that the candidate image 62 is displayed on the edit screen 70 by selecting a file of the spreadsheet data. In such a case, all of the initial piece of the spreadsheet data in the file may become the candidate image 62. Alternatively or optionally, a modification may be configured such that, by moving a file icon on to the edit screen 70 by the D & D operation, the candidate image 62 is displayed on the edit screen 70.

According to the above-described embodiment, with the operation of the mouse to locate the cursor onto each of the cell of the plurality of cells of the candidate image 62, the cells are associated with the arbitrary areas in the preview image, respectively. The configuration may be modified such that, with a mouse operation (i.e., a cursor movement) with respect to items in the header row (e.g., "Item Name", "Model Name", "Item Code" or "Image"), the designated column may be associated with an arbitrary area in the preview image 60.

According to the above-described embodiment, when the area 84 is associated with a process of converting a text to a barcode, a barcode corresponding to the text of "111111-001" is generated. When the text included in the cell is of a particular format, the text data may be used as formation information to generate the object image to be printed. It is noted that the particular text data is, for example, a plurality-of texts connected with hyphens (e.g., the text data enclosed by "<@BARCODE=>.

According to the above-described embodiment, in the instruction information ("<@File=C:\JPEG\001.jpg>), not only the folder but a file name is designated. The configuration may be modified such that only a file name is designated and a file name is not designated (e.g., "<@File=C:\JPEG>", <@Folder=C:\JPEG>). In such a case, the image data included in \JPEG may be obtained in an ascending order of the file name That is, as image data corresponding to a cell at a fourth column in the first row, the image data of a first order name, in the ascending order, of the file names may be obtained, and as image data corresponding to a cell at a fourth column in the second row, the image data of a second order name, in the ascending order, of the file names may be obtained.

According to the above-described embodiment, the processes shown in FIGS. 12-15 are executed by the CPU 12. The configuration may be modified such that a part of or all of the processes may be executed by one of or a combination of the CPU 12, an ASIC and other logical circuits.

What is claimed is:

1. A non-transitory computer-readable recording medium for an information processing device provided with a user interface and a controller, the recording medium storing instructions which cause, when executed by the controller, the information processing device to perform:
   a first obtaining process of obtaining spreadsheet data including a plurality of elements arranged in row and column; and
   a second obtaining process of obtaining template data; each of the plurality of elements being associated with object image data, the template data being data indicating a template image, the object image indicated by the object image data being arrangeable in an area in the template image,
   the instructions further cause, when executed, the information processing device to perform:
   an operation receiving process of receiving an element designating operation to designate one of a plurality of elements included in the spreadsheet data obtained in the first obtaining process and an area designating operation of designating one of areas in the template image indicated by the template data obtained in the second obtaining process; and
   a generating process of generating arranged image data representing an image in which an object image represented by the object image data associated with a designated element of the plurality of elements is arranged in the designated area in the template image, the designated element being an element designated in the element designating operation and the designated area being an area designated in the area designating operation, the instructions further cause, when executed, the information processing device to perform:
   when the designated element includes instruction information instructing an obtaining method of object image data, a third obtaining process of obtaining the object image data in accordance with the instruction information; and
   the generating process being a process of generating image data of the arranged image in which the object image represented by the object image data obtained in the third obtaining process is arranged in the designated area in the template image.

2. The non-transitory computer-readable recording medium according to claim 1,
   wherein the information processing device is provided with a scanner and a communication interface communicatable with the scanner,
   wherein, in the third obtaining process:
   when the designated element includes instruction information indicating a first method as an obtaining method of the object image, the controller transmits a scan command to the scanner and obtains scan data from the scanner as object image data through the communication interface, the first method being a method of obtaining the object image data from the scanner, wherein, in the generating process:
the controller generates image data representing an arranged image in which object images represented by the scan data obtained in the third obtaining process are arranged in designated areas on the template image.

3. The non-transitory computer-readable recording medium according to claim 2,
wherein, in the third obtaining process:
when there are multiple pieces of instruction information indicating the first process included in the designated element which is designated in the element designating operation, the controller obtains a plurality of pieces of scan data from the scanner, and
wherein, in the generating process:
the controller generates image data representing the arranged image in which object images represented by the scan data obtained in the third obtaining process are arranged in designated areas on the template image.

4. The non-transitory computer-readable recording medium according to claim 3, wherein, in the third obtaining process:
when the controller receives a designation operation to designate the plurality of designated elements and the plurality of designated elements in associated manner in the operation receiving process and each of the plurality of designated elements includes the instruction information indicating the first method, the controller transmits, for the plurality of designated elements, scan commands respectively corresponding the designated elements to the scanner and obtains the scan data from the scanner, and
wherein in the generating process:
the controller generates image data representing an arranged image in which, for each of the plurality of designated elements, scan data corresponding to the designated element is arranged in the designated area corresponding to the designated element in the template image.

5. The non-transitory computer-readable recording medium according to claim 2,
wherein the information processing device is provided with a display, and
wherein, in the third processing process:
when the designated elements designated in the element designating operation include a plurality of pieces of instruction information designating the first method but the same number of pieces of the scan data as the number of pieces of the designated information cannot be obtained, the controller displays in image indicating that the same number of pieces of the scan data as the number of pieces of the designated information cannot be obtained, transmits the scan command to the scanner and obtains the scan data from the scanner through the communication interface.

6. The non-transitory computer-readable recording medium according to claim 2, wherein the instructions cause the controller to perform a first display controlling process in which, when neither the element designating operation nor the area designating operation is received in the operation receiving process:

the controller displays an image in which object images represented by the object data associated with designated elements which do not include instruction information are arranged in the designated areas on the template image on the display, and
the controller displays an image in which object images represented by the object data associated with designated elements which include designated information indicating the first method on the display without transmitting the scan command to the scanner,
wherein, in the third obtaining process:
when a generation command instructing to generate the arranged image is received; through the user interface, after an image is displayed in the first display control process, the controller transmits the scan command to the scanner regarding the designated element including the instruction information indicating the first method and obtains the scan data from the scanner through the communication interface, and wherein, in the generating process:
for the designated elements including the instruction information indicating the first method, the controller generates image data representing an arranged image in which the object images represented by the scan data obtained in the third obtaining process are arranged in the designated areas on the template image.

7. The non-transitory computer-readable recording medium according to claim 6,
wherein, in the generating process:
for the designated elements including the instruction information indicating the first method, the controller generates image data representing the arranged image in which the object images represented by the scan data obtained in the third obtaining process are arranged in the designated areas on the template image as printing image data.

8. The non-transitory computer-readable recording medium according to claim 1,
wherein, in the third obtaining process:
when the instruction information indicating the second method as the obtaining method of the object images is included in the designated elements, the controller obtains the object images from the storage area, the second method being a method of obtaining the object image from the storage area,
wherein, in the generating process:
the controller generates image data representing the arranged image in which the object images represented by the scan data obtained in the third obtaining process are arranged in the designated areas on the template image.

9. The non-transitory computer-readable recording medium according to claim 8, wherein the information processing device is provided with a display, wherein, in the third obtaining process:
when the designated elements designated in the element designating operation include a plurality of pieces of instruction information designating the second method but the same number of pieces of the object image as the number of pieces of the designated information cannot be obtained from the storage area, the controller displays in image indicating that the same number of pieces of the object data as the number of pieces of the designated information cannot be obtained from the storage area, and obtains the object images from the storage area.

10. The non-transitory computer-readable recording medium according to claim 1,
wherein, in the generating process:
when the designated elements and the designated areas are designated in the operation receiving process and the designated elements are included in one row or one column of the rows and columns along which a plurality of elements included in the spreadsheet data the controller generates:
image data representing a first arranged image in which object images represented by the object data associated with the designated elements are arranged in the designated areas of the template image; and
image data representing a second arranged image in which object images represented by the object data associated with designated elements included in an other row different from the one row or an other column different from the one column of the rows and columns are arranged in the designated areas of the template image.

11. The non-transitory computer-readable recording medium according to claim 10,
wherein, in the operation receiving process:
the controller receives a row/column designation operation to designate any of row and column in which a plurality of elements included in the spreadsheet data obtained in the first obtaining process are arranged,
wherein, in the generating process:
when the designated element and designated area are designated in the operation receiving process and the designated element is included in one of a row and a column of the row and column in which a plurality of elements included in the spreadsheet data, the controller generates the image data of the first arranged image; and
when the row/column designation operation designated the other row different from the one row or the other column different from the one column of the rows and columns is received, the controller generates the image data of the second arranged image.

12. The non-transitory computer-readable recording medium according to claim 1,
wherein the information processing device is provided with a display,
wherein the instructions cause the controller to perform a second display controlling process to display a tabular format image represented by the spreadsheet data obtained in the first obtaining process and the template image represented by the template data obtained in the second obtaining process on the display, and
wherein, in the operation receiving process, the controller receives:
an element designation operation which is an operation with respect to the tabular format image; and
an area designation operation which is an operation with respect to the template image.

13. An information processing device, comprising:
a user interface; and a controller,
the controller being configured to execute:
obtaining spreadsheet data including a plurality of elements arranged in row and column;
obtaining template data, each of the plurality of elements being associated with object image data, the template data being data indicating a template image, the object image indicated by the object image data being arrangeable in an area in the template image;
receiving an element designating operation to designate one of a plurality of elements included in the spreadsheet data obtained in the first obtaining process and designating one of areas in the template image indicated by the template data;
generating arranged image data representing an image in which an object image represented by the object image data associated with a designated element of the plurality of elements is arranged in the designated area in the template image, the designated element being an element designated in the element designating operation and the designated area is an area designated in the area designating operation;
when the designated element includes instruction information instructing an obtaining method of object image data, obtaining the object image data in accordance with the instruction information; and
generating image data of the arranged image in which the object image represented by the obtained object image data is arranged in the designated area in the template image.

14. An information processing system, comprising:
an information processing device provided with a communication interface, a user interface and a controller; and
a printer configured to communicate with the information processing deice through the communication interface,
wherein the controller of the information processing device is configured to execute:
obtaining spreadsheet data including a plurality of elements arranged in row and column;
obtaining template data, each of the plurality of elements being associated with object image data, the template data being data indicating a template image, the object image indicated by the object image data being arrangeable in an area in the template image;
receiving an element designating operation to designate one of a plurality of elements included in the spreadsheet data obtained in the first obtaining process and designating one of areas in the template image indicated by the template data;
generating arranged image data representing an image in which an object image represented by the object image data associated with a designated element of the plurality of elements is arranged in the designated area in the template image, the designated element being an element designated in the element designating operation and the designated area is an area designated in the area designating operation;
when the designated element includes instruction information instructing an obtaining method of object image data, obtaining the object image data in accordance with the instruction information;
generating image data of the arranged image in which the object image represented by, the obtained object image data is arranged in the designated area in the template image; and
transmitting the generated image data to the printer through the communication interface,
wherein the printer is configured to print the generated image data in response to receipt of the generated image data.

* * * * *

UNITED STATES PATENT AND TRADEMARK OFFICE
CERTIFICATE OF CORRECTION

PATENT NO. : 10,511,728 B2
APPLICATION NO. : 16/257365
DATED : December 17, 2019
INVENTOR(S) : Eiji Arakawa It is certified that error appears in the above-identified patent and that said Letters Patent is hereby corrected as shown below:

In the Claims

Column 22, Claim 6, Line 16 should read:
the scanner regarding the designated elements including Column 24, Claim 14, Line 30 should read:
processing device through the communication interface, Column 24, Claim 14, Line 58 should read:
object image represented by the obtained object image Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*